US012070837B2

(12) United States Patent
Butterfield, IV et al.

(10) Patent No.: US 12,070,837 B2
(45) Date of Patent: Aug. 27, 2024

(54) FLUSHING RING ALIGNMENT TOOL

(71) Applicant: Chevron U.S.A. Inc., San Ramon, CA (US)

(72) Inventors: Albert E. Butterfield, IV, Novato, CA (US); Jason Frederick Riede, Ocean Springs, MS (US)

(73) Assignee: Chevron U.S.A. Inc., San Ramon, CA (US)

( * ) Notice: Subject to any disclaimer, the term of this patent is extended or adjusted under 35 U.S.C. 154(b) by 259 days.

(21) Appl. No.: 17/867,806

(22) Filed: Jul. 19, 2022

(65) Prior Publication Data

US 2024/0025019 A1 Jan. 25, 2024

(51) Int. Cl.
*B25B 11/02* (2006.01)
*F17C 13/02* (2006.01)

(52) U.S. Cl.
CPC .............. *B25B 11/02* (2013.01); *F17C 13/02* (2013.01)

(58) Field of Classification Search
CPC ..... B25B 11/02; B25B 27/0028; B25B 33/00; E03D 1/34; F16L 23/003; F16L 23/006; F17C 2205/0394–0397; F17C 2205/0329; F17C 2205/0335; Y10T 29/53552; Y10T 29/49719; Y10T 29/53913
See application file for complete search history.

(56) References Cited

U.S. PATENT DOCUMENTS

2016/0136796 A1* 5/2016 Baker ................. B25B 27/0028 29/270

OTHER PUBLICATIONS

Emerson Rosemount DP Level Transmitters and Diaphragm Seal Systems, Reference Manual 00809-0100-4002, Rev FA, Apr. 2022.
Shridhan Flushing Rings Manual, Apr. 2018, available at https://shridhan.com/node/13.

* cited by examiner

*Primary Examiner* — Tyrone V Hall, Jr.
(74) *Attorney, Agent, or Firm* — Avery L. Cate

(57) ABSTRACT

An alignment tool is used to install an instrument onto a vessel. The alignment tool includes a semicylindrical body having an inner surface, an outer surface, a process end surface, and an instrument end surface. The inner surface comprises a process bearing surface, an instrument bearing surface, and a ring bearing disposed between the process bearing surface and the instrument bearing surface. The ring bearing comprises a first fastener aperture, a second fastener aperture, and a ring bearing surface having an alignment feature.

20 Claims, 16 Drawing Sheets

FLUSHING RING ALIGNMENT TOOL

TECHNICAL FIELD

Embodiments of the technology relate generally to a tool for aligning a flushing ring with an instrument assembly.

BACKGROUND

Petrochemical processing plants, such as refineries, typically comprise vessels, such as tanks and pipes, containing fluids. The fluid within the vessel can be monitored using instruments that attach to one or more ports in the vessel. The instruments can be gauges that measure pressure, differential pressure, or other properties within the vessel. Proper installment of the instrument onto the vessel is necessary for the instrument to function properly and to avoid leaking of fluid from the vessel. Accordingly, tools that assist with the proper installation of such instruments onto vessels would be beneficial.

SUMMARY

In one example embodiment, the present disclosure is generally directed to an alignment tool. The alignment tool can comprise: a semicylindrical body having an inner surface, an outer surface, a process end surface, and an instrument end surface. The inner surface of the alignment tool can comprise: a process bearing surface; an instrument bearing surface; and a ring bearing disposed between the process bearing surface and the instrument bearing surface. The ring bearing can comprise: a first fastener aperture; a second fastener aperture; and a ring bearing surface having an alignment feature.

In another example embodiment, the present disclosure is directed to a method of installing an instrument using an alignment tool. The method can comprise: placing a process flange onto a process bearing surface of the alignment tool; placing an instrument flange onto an instrument bearing surface of the alignment tool; and placing a flushing ring onto a ring bearing of the alignment tool. With the flanges and flushing ring in place on the alignment tool, a first fastener can be inserted through an aperture in the instrument flange and through a first fastener aperture of the ring bearing. Similarly, a second fastener can be inserted through a second aperture in the instrument flange and through a second fastener aperture of the ring bearing. Next, an instrument gasket can be placed onto the alignment tool between the instrument flange and the flushing ring and a process gasket can be placed onto the alignment tool between the process flange and the flushing ring. With the components in place and properly aligned on the alignment tool, the first fastener and the second fastener can be tightened onto apertures of the process flange thereby securing the instrument flange, the instrument gasket, the flushing ring, the process gasket, and the process flange together onto the process flange. Lastly, once the instrument is properly attached to the process flange using the alignment tool, the alignment tool can be removed.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments of an alignment tool and methods of using an alignment tool and therefore are not to be considered limiting of the scope of this disclosure. The principles illustrated in the example embodiments of the drawings can be applied to alternate methods and apparatus. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements.

DETAILED DESCRIPTION OF EXAMPLE EMBODIMENTS

The example embodiments discussed herein are directed to apparatus and methods involving installation of instruments. The example apparatus and methods described herein are particularly beneficial in the oil and gas industry where instruments are often mounted to tanks, pipes, and other fluid containing vessels. In particular, the embodiments disclosed herein describe an alignment tool and a method of using the alignment tool in connection with mounting an instrument to a fluid vessel. The examples described herein improve upon prior approaches in that they facilitate proper installation of the instrument allowing a worker to more easily and to more quickly install the instrument. The alignment tool also facilitates proper installation of the instrument onto the vessel to avoid leaks and to ensure that the instrument functions correctly. The alignment tool also facilitates the installation by holding several components in place while the instrument is secured to the vessel.

Such instruments attached to vessels often include a flushing ring. Flushing rings are used with flanged chemical seal systems for flushing or venting the space immediately in front of the instrument's diaphragm. The flushing ring is mounted between the flanged process connection (the connection on the vessel) and the instrument's diaphragm seal. The flushing ring has flushing ports, typically located on each lateral side of the flushing ring, that allow washing out of material or particles that have accumulated in front of the instrument's membrane. Additionally, pressure within the space that is occupied by the flushing ring can be vented or drained via the flushing ports of the flushing ring. The alignment tool described herein facilitates proper installation of the instrument and its flushing ring.

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Figure 1:
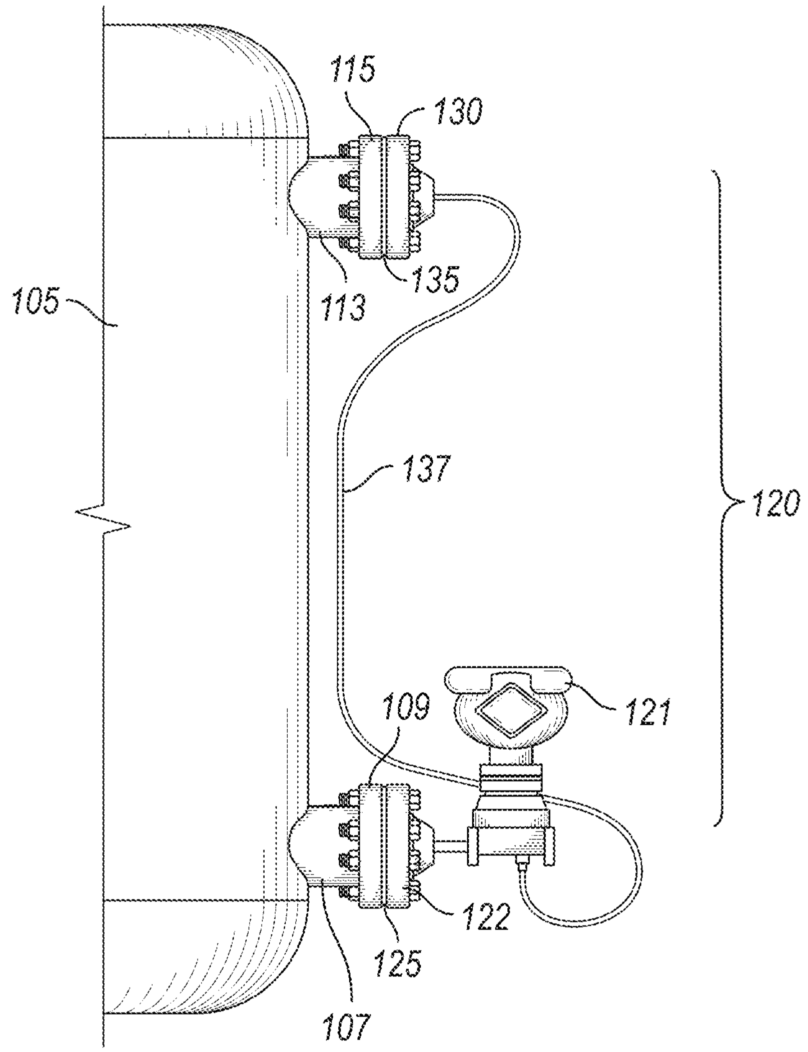
FIG. 1 illustrates an instrument attached to a vessel in accordance with an example embodiment of the disclosure.
Figure 2:
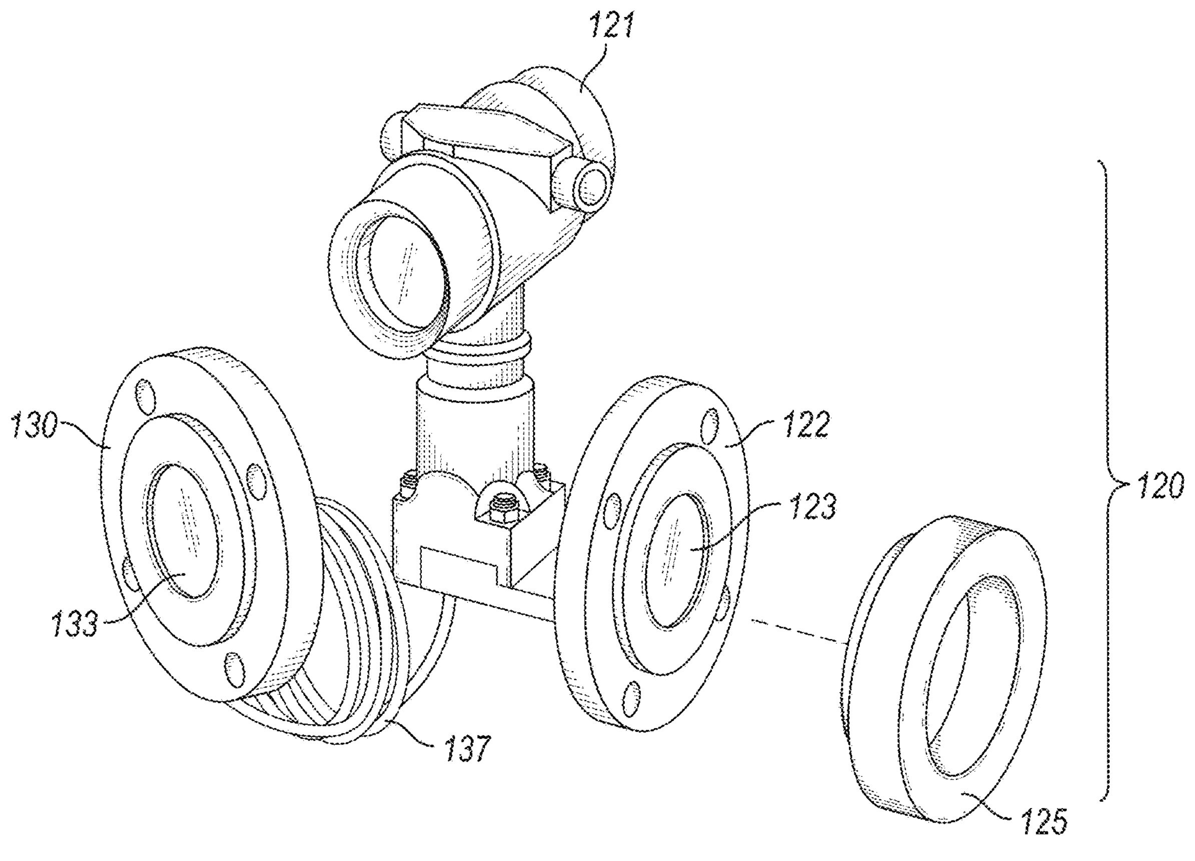
FIG. 2 illustrates another view of an instrument that can be attached to a vessel in accordance with an example embodiment of the disclosure.

FIG. 1 illustrates an instrument assembly attached to a vessel and FIG. 2 illustrates the components of the instrument assembly. The attachment of the instrument assembly to the vessel will be described in connection with FIGS. 1 and 2 before turning to the alignment tool illustrated and the subsequent figures.

Referring to FIGS. 1 and 2, an example instrument assembly 120 attached to an example vessel 105 is illustrated. The vessel 105 can be a pipe, a tank, or another type of vessel for storing or transporting fluids. The vessel has a first port 107 with a first process flange 109 and a second port 113 with a second process flange 115. The ports and the process flanges provide locations for attaching instruments that can take measurements of fluid within the vessel. While two ports are illustrated in FIG. 1, it should be understood that a fewer or greater number of ports may be present on other example vessels. In the example of FIGS. 1 and 2, the instrument assembly comprises an instrument 121, an instrument flange 122 with a corresponding instrument diaphragm 123, and a remote instrument flange 130 with a corresponding remote diaphragm 133. The instrument flange 122 couples to the first process flange 109 and the remote instrument flange 130 couples to the second process flange 115. The remote instrument flange 130 and remote diaphragm 133 are coupled to the instrument 121 by a capillary tube that transfers signals from the remote diaphragm 133 to the instrument 121. Lastly a flushing ring 125 is located between the instrument flange 122 and the first process flange 109 and a remote flushing ring 135 is located between the remote instrument flange 130 and the second process flange 115.

Proper attachment of the instrument flanges and flushing rings to the process flanges of the vessel can be challenging and time consuming. Accordingly, an alignment tool, such as that illustrated and described in the examples herein, can facilitate the attachment of the instrument to the vessel.

Figure 3:
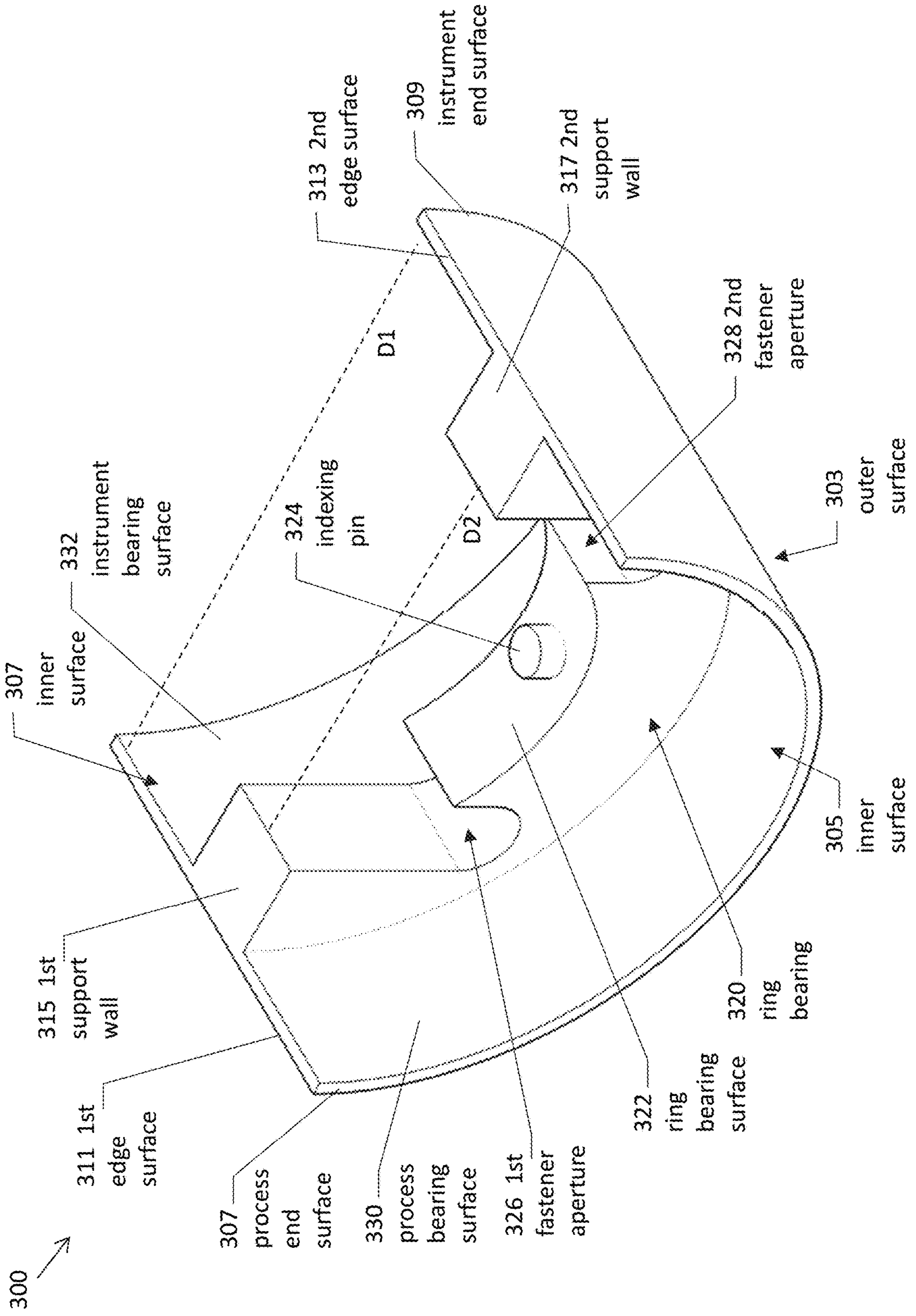
FIG. 3 illustrates an alignment tool that can be used for attaching an instrument to a vessel in accordance with an example embodiment of the disclosure.
Figure 4:
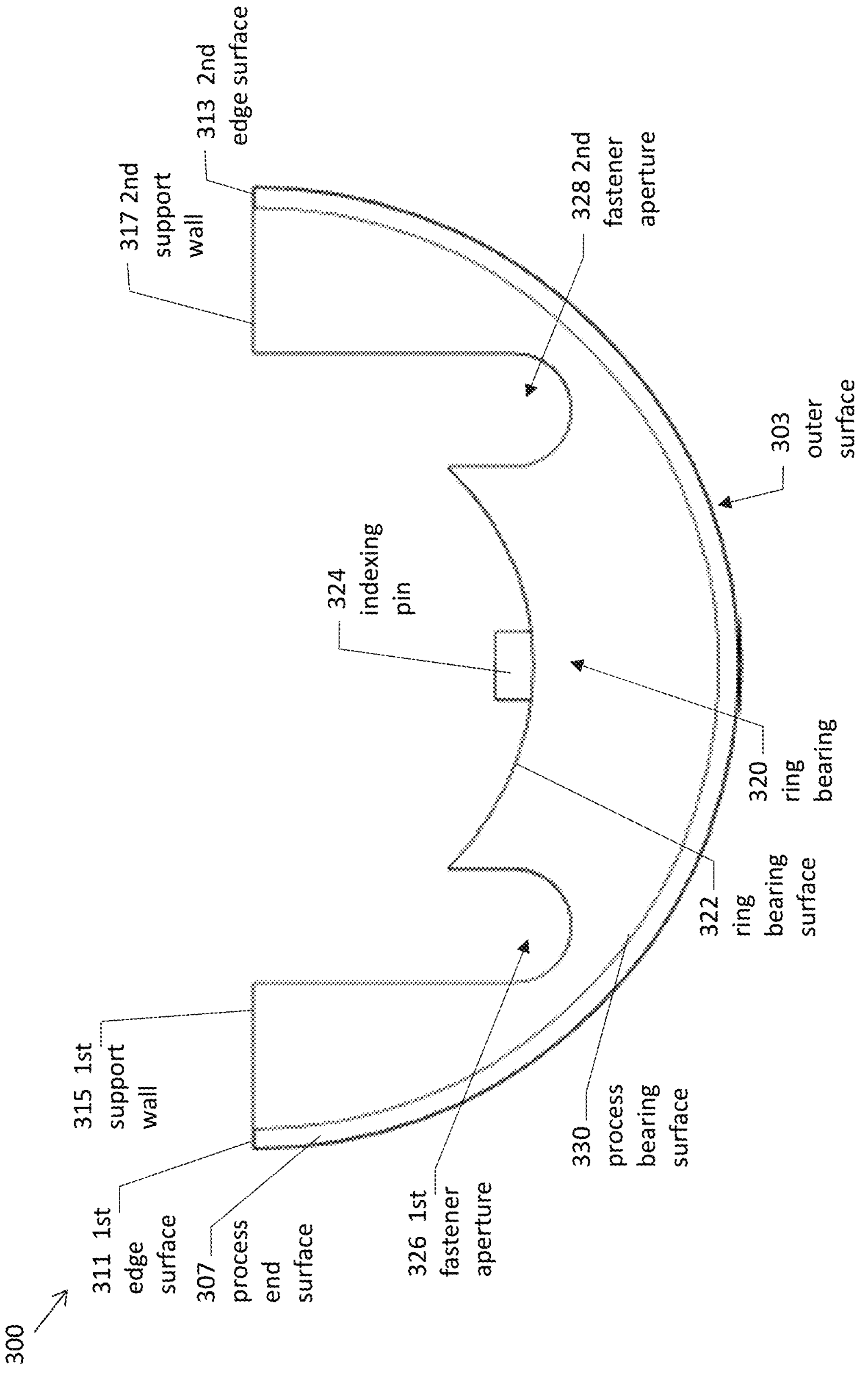
FIG. 4 illustrates another view of the alignment tool of FIG. 3 in accordance with an example embodiment of the disclosure.

Referring to FIGS. 3 and 4, a first example of an alignment tool 300 is illustrated. FIG. 3 provides a perspective view of the alignment tool 300, while FIG. 4 provides an elevation view from one end of the alignment tool 300. It should be understood that the alignment tool illustrated in FIGS. 3 and 4 is an example and that in alternate embodiments the alignment tool can take alternate forms. For example, in alternate embodiments, aspects of the alignment tool can have different dimensions or different proportions. Additionally, in alternate embodiments, certain of the features of the alignment tool illustrated in FIGS. 3 and 4 may be modified or omitted. Furthermore, in alternate embodiments additional features may be added to the alignment tool.

The alignment tool 300 has a generally semi-cylindrical shape and can be made from a variety of materials, including but not limited to plastic, carbon fiber, metals, and metal alloys. The alignment tool 300 has an outer surface 303 and an inner surface 307 generally defining the semi-cylindrical shape. The outer and inner surfaces are bounded by a first edge surface 311, a second edge surface 313, a process end surface 307, and an instrument end surface 309. A diameter D1 extends between the first edge surface 311 and the second edge surface 313. Adjacent to the process end surface 307 is a process bearing surface 330 that receives a process flange, such as the process flanges attached to the vessel 105 of FIG. 1. Adjacent to the instrument end surface 309 is an instrument bearing surface 332 that receives an instrument flange, such as the instrument flanges of the instrument assembly 120 of FIG. 1.

Between the process bearing surface 330 and the instrument bearing surface 332, a first support wall 315, a second support wall 317, and a ring bearing 320 extend from the inner surface 305 and into the interior of the alignment tool 300. The first support wall 315 is adjacent to the first edge surface 311, while the second support wall 317 is adjacent to the second edge surface 313. The first support wall 315 and the second support wall 317 extend only a portion of the way from the first edge surface 311 and the second edge surface 313, respectively, so that a diameter D2, smaller than diameter D1, extends in the gap between the first support wall 315 and the second support wall 317. The ring bearing 320 extends from the inner surface 305 and is disposed in the gap between the first support wall 315 and the second support wall 317. At the top of the ring bearing 320 is a ring bearing surface 322 that is curved to receive and support a flushing ring. The ring bearing surface 322 can have an alignment feature, such as an indexing pin 324, that fits into a recess in the outer circumference of the flushing ring when the flushing ring is placed on the ring bearing surface 322. The alignment feature assists in properly aligning the flushing ring when it is resting on the ring bearing surface 322.

A first fastener aperture 326 is located between the ring bearing 320 and the first support wall 315. Similarly, a second fastener aperture 328 is located between the ring bearing 320 and the second support wall 317. As will be described and illustrated further below, the first and second fastener apertures allow fasteners to pass through the instrument flange, through the alignment tool, and into the process flange as the instrument flange is being aligned and secured to the process flange. As illustrated in FIG. 3, the first and second fastener apertures can have a slot type of shape. It should be understood that in alternate embodiments, the first and second support walls, the ring bearing, the ring bearing surface, and the first and second fastener apertures can have alternate shapes or proportions from those illustrated in FIGS. 3 and 4.

Figure 5:
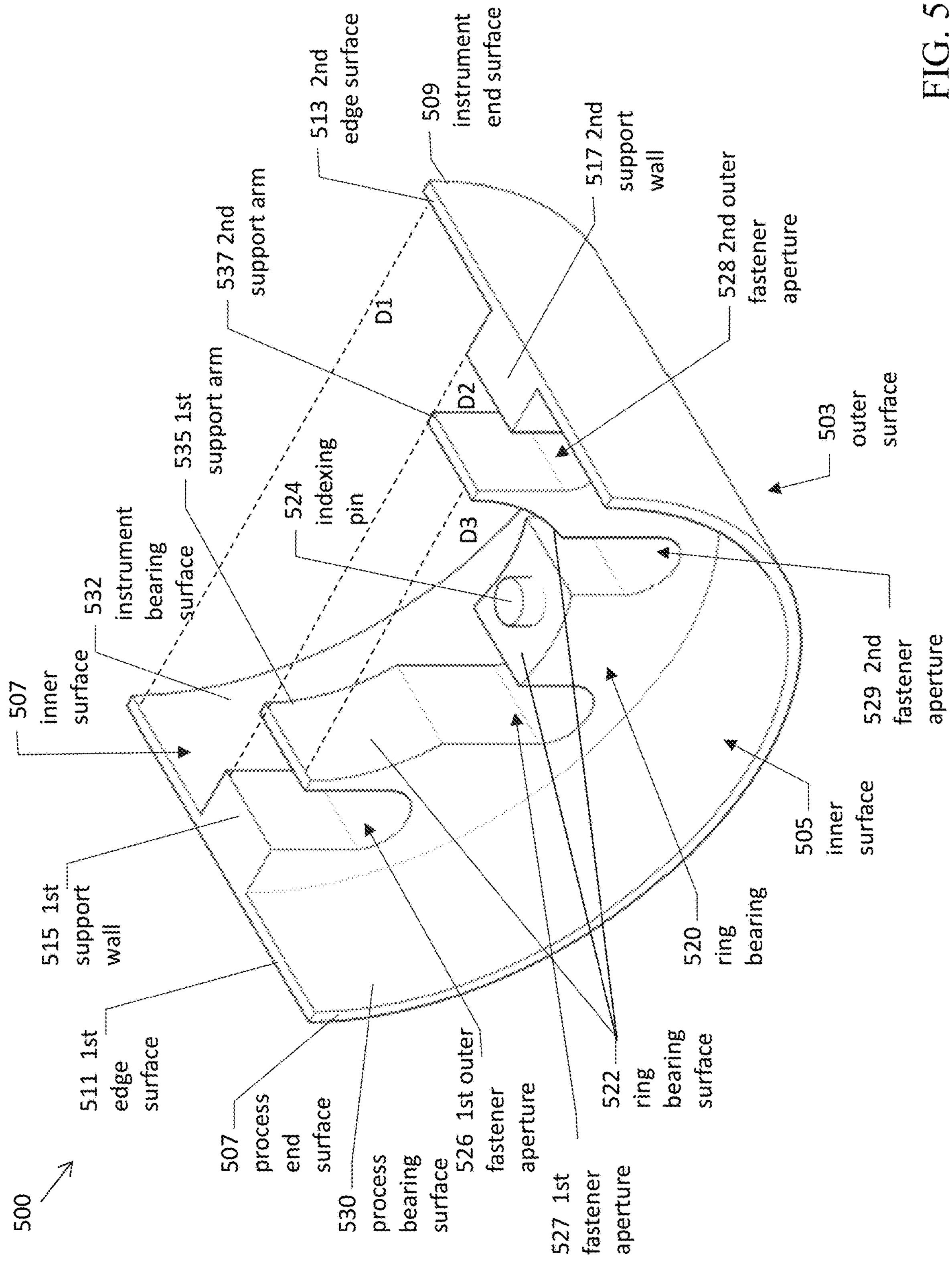
FIG. 5 illustrates another example of an alignment tool that can be used for attaching an instrument to a vessel in accordance with an example embodiment of the disclosure.
Figure 6:
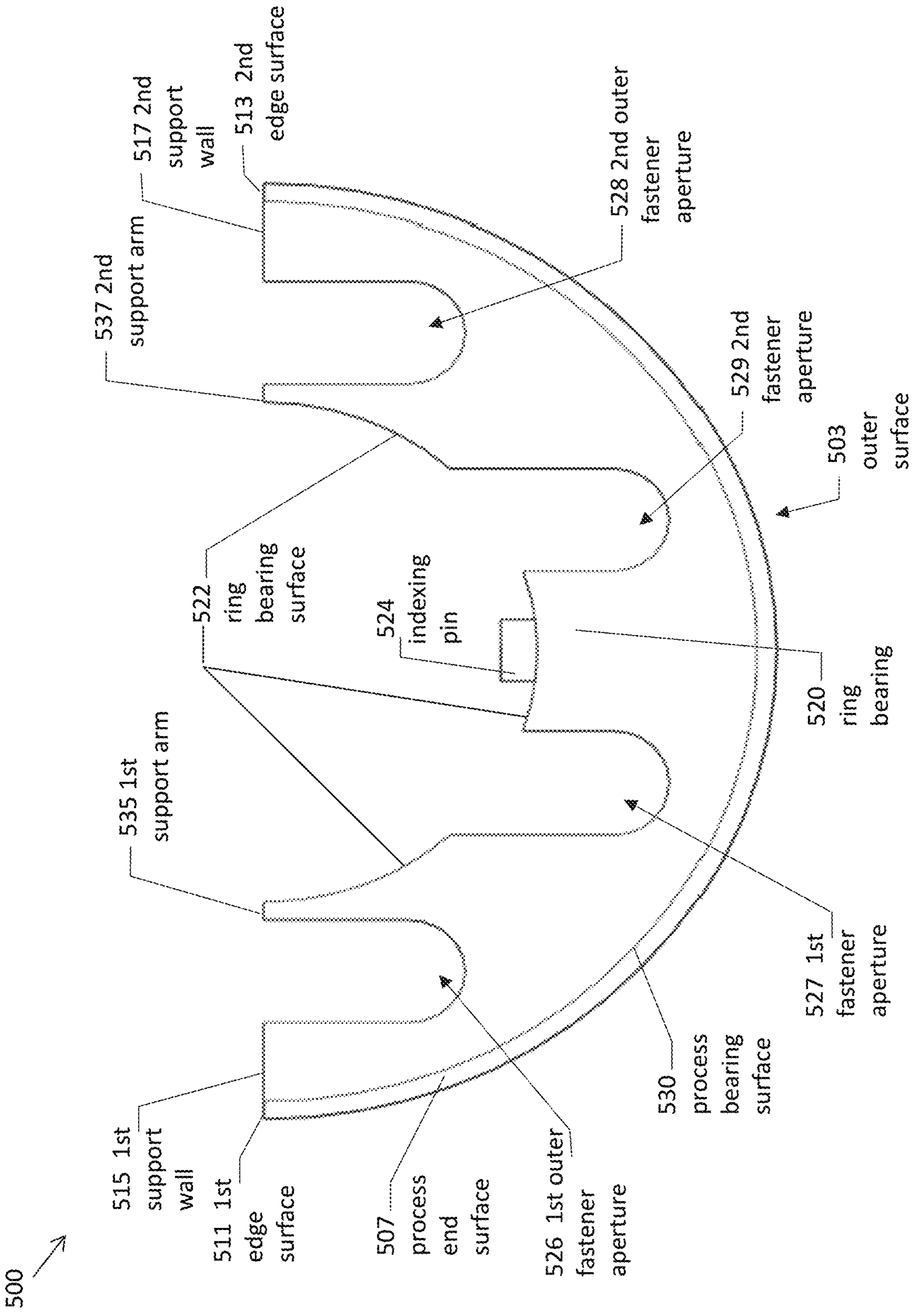
FIG. 6 illustrates another view of the alignment tool of FIG. 5 in accordance with an example embodiment of the disclosure.

Referring to FIGS. 5 and 6, another example of an alignment tool 500 is illustrated. FIG. 5 provides a perspective view of the alignment tool 500, while FIG. 6 provides an elevation view from one end of the alignment tool 500. It should be understood that the alignment tool illustrated in FIGS. 5 and 6 is an example and that in alternate embodiments the alignment tool can take alternate forms. For example, in alternate embodiments, aspects of the alignment tool can have different dimensions or different proportions. Additionally, in alternate embodiments, certain of the features of the alignment tool illustrated in FIGS. 5 and 6 may be modified or omitted. Furthermore, in alternate embodiments additional features may be added to the alignment tool. As will be described further, alignment tool 500 has many similarities to alignment tool 300.

Similar to alignment tool 300, alignment tool 500 has a generally semi-cylindrical shape and can be made from a variety of materials, including but not limited to plastic, carbon fiber, metals, and metal alloys. Alignment tool 500 has an outer surface 503 and an inner surface 507 generally defining the semi-cylindrical shape. The outer and inner surfaces are bounded by a first edge surface 511, a second edge surface 513, a process end surface 507, and an instrument end surface 509. A diameter D1 extends between the first edge surface 511 and the second edge surface 513. Adjacent to the process end surface 507 is a process bearing surface 530 that receives a process flange, such as the process flanges attached to the vessel 105 of FIG. 1. Adjacent to the instrument end surface 509 is an instrument bearing surface 532 that receives an instrument flange, such as the instrument flanges of the instrument assembly 120 of FIG. 1.

Between the process bearing surface 530 and the instrument bearing surface 532, a first support wall 515, a second support wall 517, and a ring bearing 520 extend from the inner surface 505 and into the interior of the alignment tool 500. The first support wall 515 is adjacent to the first edge surface 511, while the second support wall 517 is adjacent to the second edge surface 513. The first support wall 515 and the second support wall 517 extend only a portion of the way from the first edge surface 511 and the second edge surface 513, respectively, so that a diameter D2, smaller than diameter D1, extends in the gap between the first support wall 515 and the second support wall 517. The ring bearing 520 extends from the inner surface 505 and is disposed in the gap between the first support wall 515 and the second support wall 517. At the top of the ring bearing 520 is a ring bearing surface 522 that is curved to receive and support a flushing ring. The ring bearing surface 522 can have an alignment feature, such as an indexing pin 524, that fits into a recess in the outer circumference of the flushing ring when the flushing ring is placed on the ring bearing surface 522. The alignment feature assists in properly aligning the flushing ring when it is resting on the ring bearing surface 522.

Alignment tool 500 differs from alignment tool 300 in that alignment tool 500 provides four fastener apertures. In the region between the first support wall 515 and the ring bearing 520, a first arm support 535 extends from the inner surface 505 toward the interior of the alignment tool. A first outer fastener aperture 526 is located between the first support wall 515 and the first arm support 535, whereas a first fastener aperture 527 is located between the first arm support 535 and the ring bearing 520. Similarly, in the region between the second support wall 517 and the ring bearing 520, a second arm support 537 extends from the inner surface 505 toward the interior of the alignment tool. A second outer fastener aperture 528 is located between the second support wall 517 and the second arm support 537, whereas a second fastener aperture 529 is located between the second arm support 537 and the ring bearing 520. The four fastener apertures allow fasteners to pass through the instrument flange, through the alignment tool, and into the process flange as the instrument flange is being aligned and secured to the process flange. As illustrated in FIG. 5, the first and second fastener apertures can have a slot type of shape. As further illustrated in FIG. 5, the first support arm 535 and the second support arm 537 include ring bearing surfaces 522 that complement the ring bearing surface on the top of the ring bearing 520. That is, the ring bearing surfaces on the support arms are curved to support the flushing ring when it is placed onto the alignment tool. The distance between the first support arm 535 and the second support arm 537 can be referred to as diameter D3, which is smaller than diameter D2. It should be understood that in alternate embodiments, the first and second support walls, the first and second support arms, the ring bearing, the ring bearing surface, and the four fastener apertures can have alternate shapes or proportions from those illustrated in FIGS. 5 and 6.

Referring now to FIGS. 7-16, an example method for using an alignment tool is illustrated. While FIGS. 7-16 illustrate use of the alignment tool 500 from FIGS. 5 and 6, it should be understood that the example method of FIGS. 7-16 can use the alignment tool 300 of FIGS. 3 and 4 or other variations of the example alignment tools described herein. Furthermore, it should be understood that the method of FIGS. 7-16 is a non-limiting example and in alternate embodiments certain steps of the method may be performed in a different sequence, modified, combined, performed in parallel, or omitted.

Figure 7:
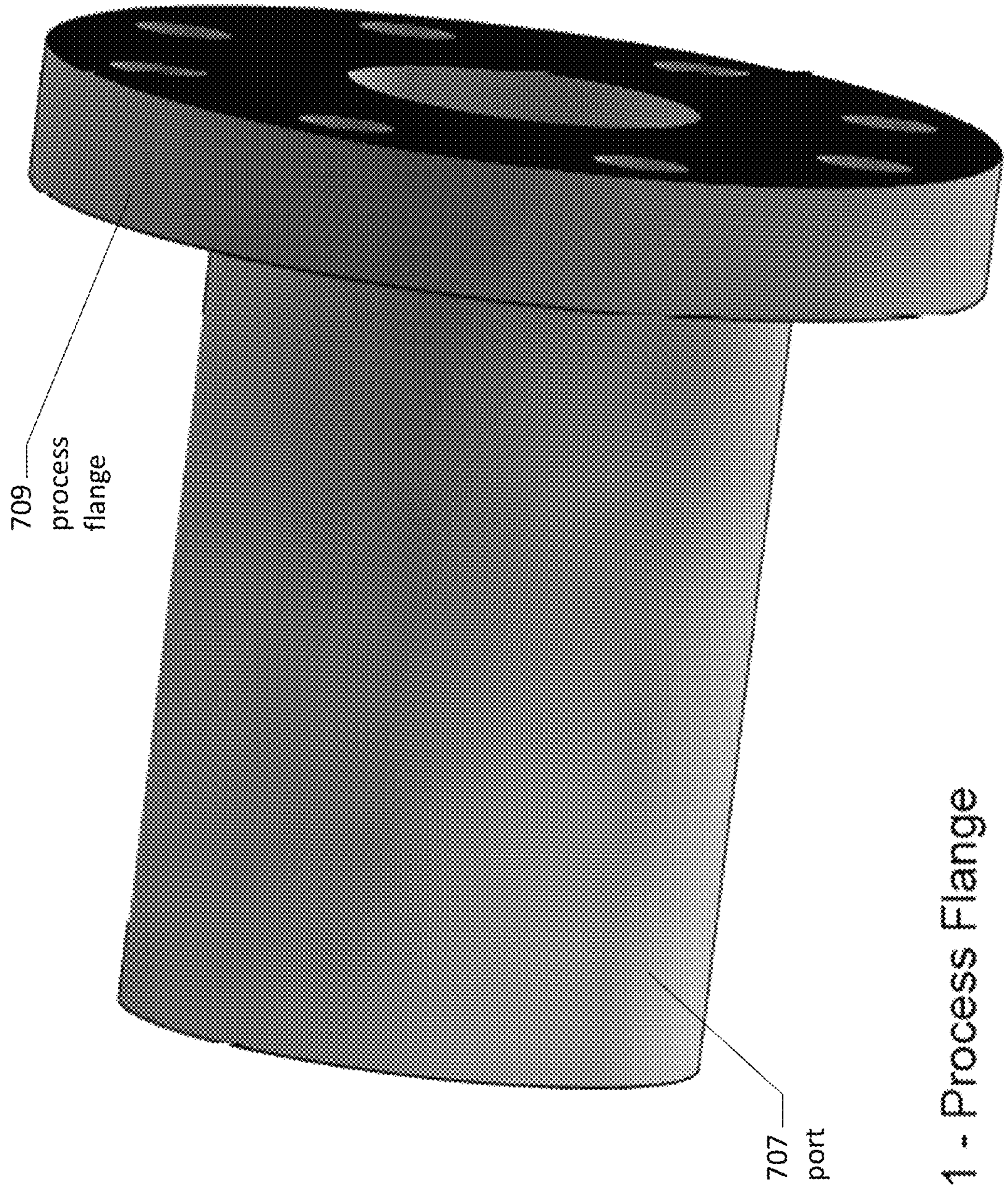
FIGS. 7 through 16 illustrate a method of using an alignment tool for attaching an instrument to a vessel in accordance with an example embodiment of the disclosure.
Figure 8:
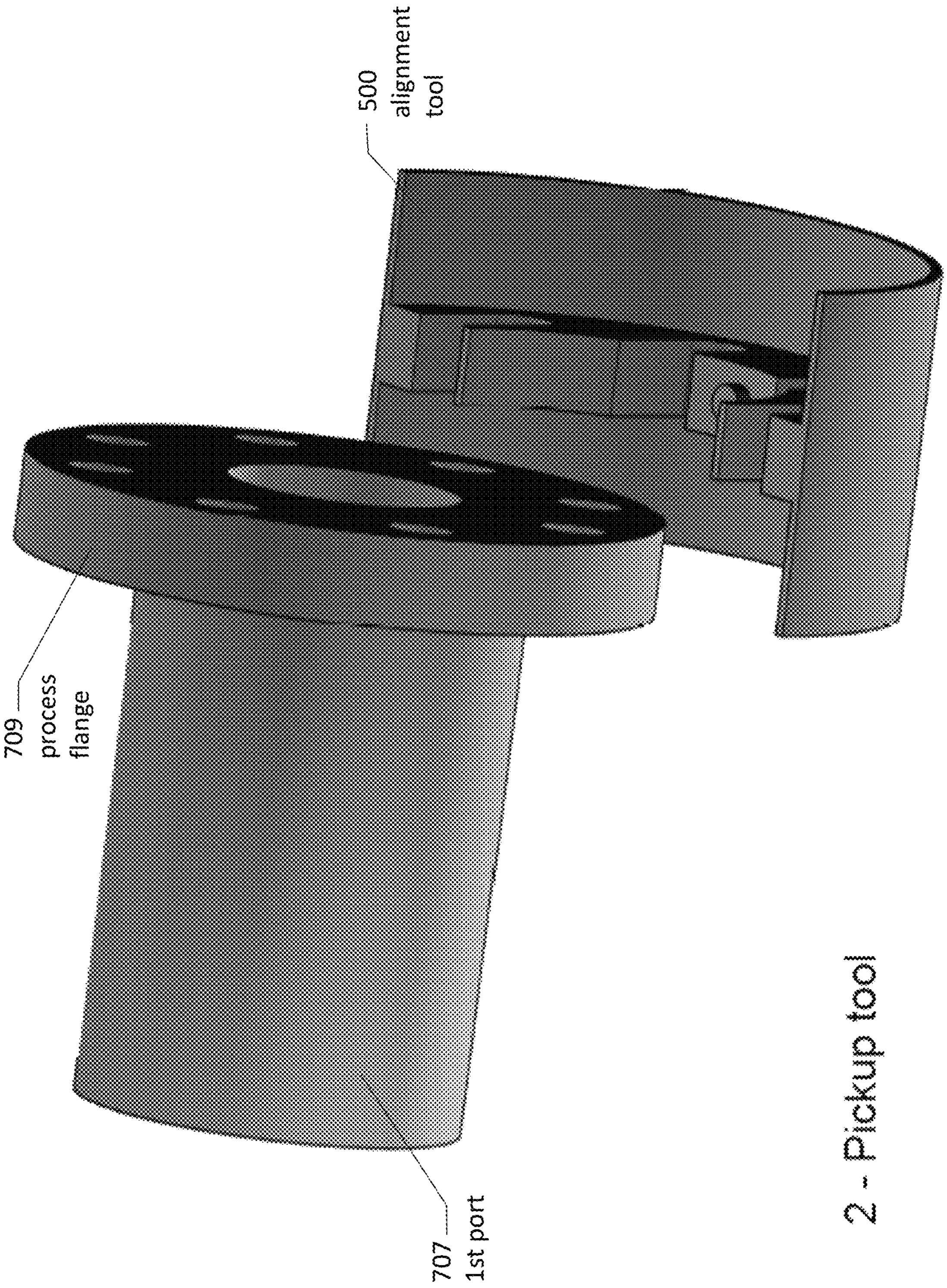
Figure 9:
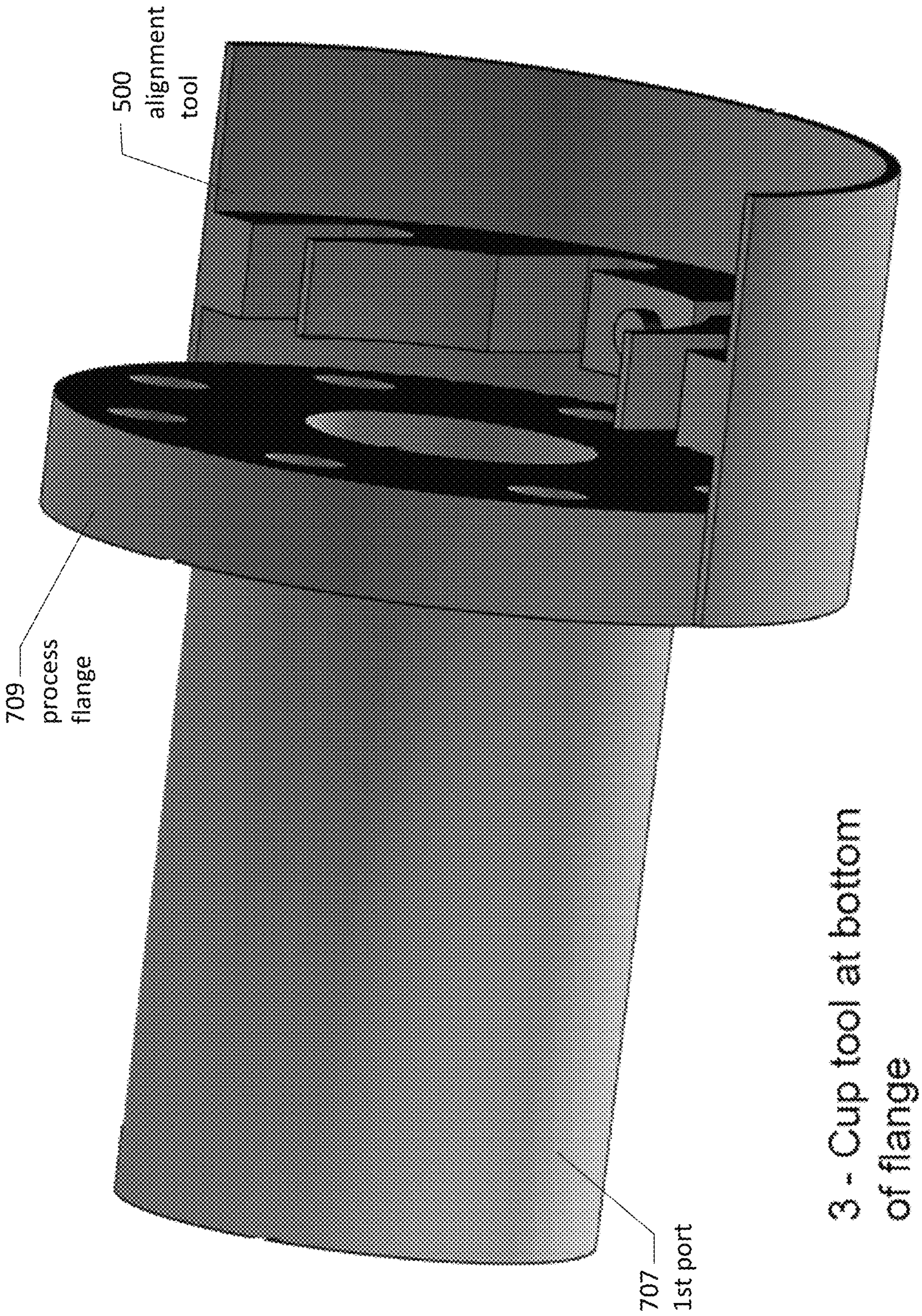

Beginning with operation 1 of FIG. 7, a port 707 and a process flange 709 of a vessel (not shown) are illustrated. The port 707 and process flange 709 provide an access point for taking measurements of conditions within the vessel, such as pressure. In FIGS. 8 and 9, operation 2 illustrates the alignment tool 500 and operation 3 illustrates the alignment tool being brought into position under the process flange 709 so that the process flange 709 rests on the process bearing surface of the alignment tool 500.

Figure 10:
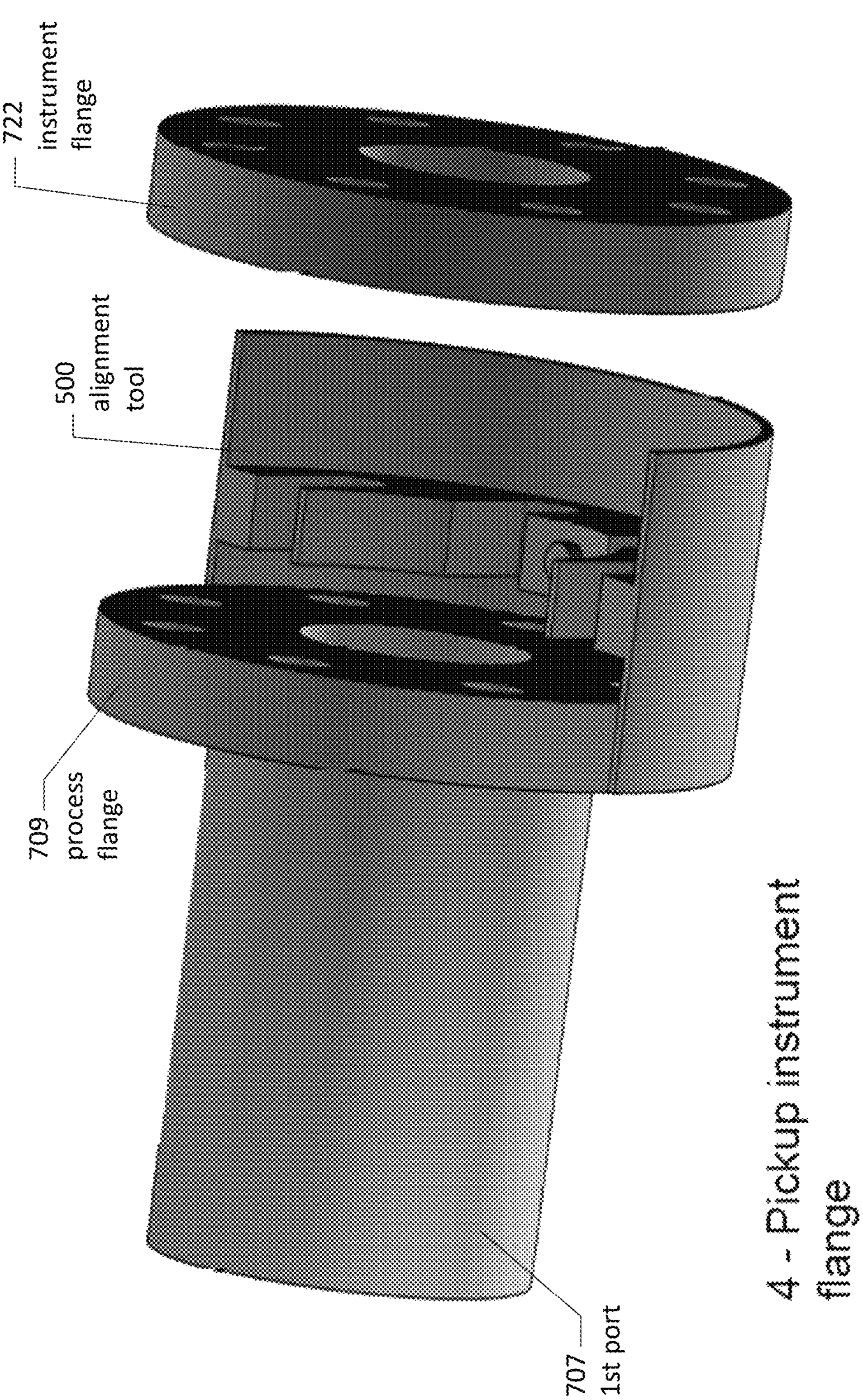
Figure 11:
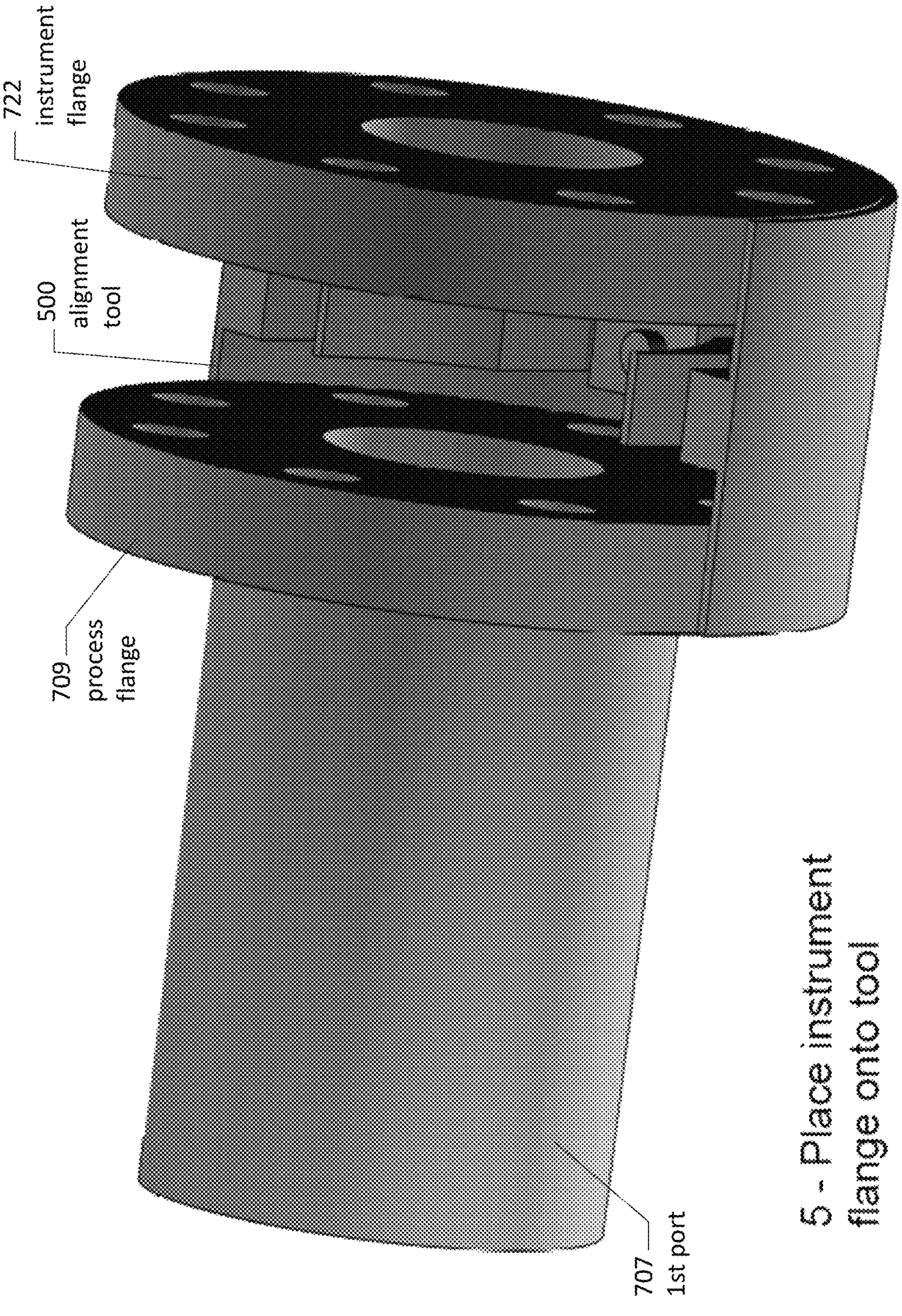

FIGS. 10 and 11 illustrate operations 4 and 5 in which the instrument flange 722 is placed onto the instrument bearing surface of the alignment tool 500. Although the instrument is not shown for simplicity in FIGS. 10 and 11, as illustrated in FIGS. 1 and 2, the instrument flange 722 can be coupled directly to the instrument or coupled via a capillary to the instrument. It should be understood that in alternate embodiments, operations 1 through 5 could be modified such that first the instrument flange is placed on the alignment tool followed by the alignment tool with the instrument flange being brought into contact with the process flange.

Figure 12:
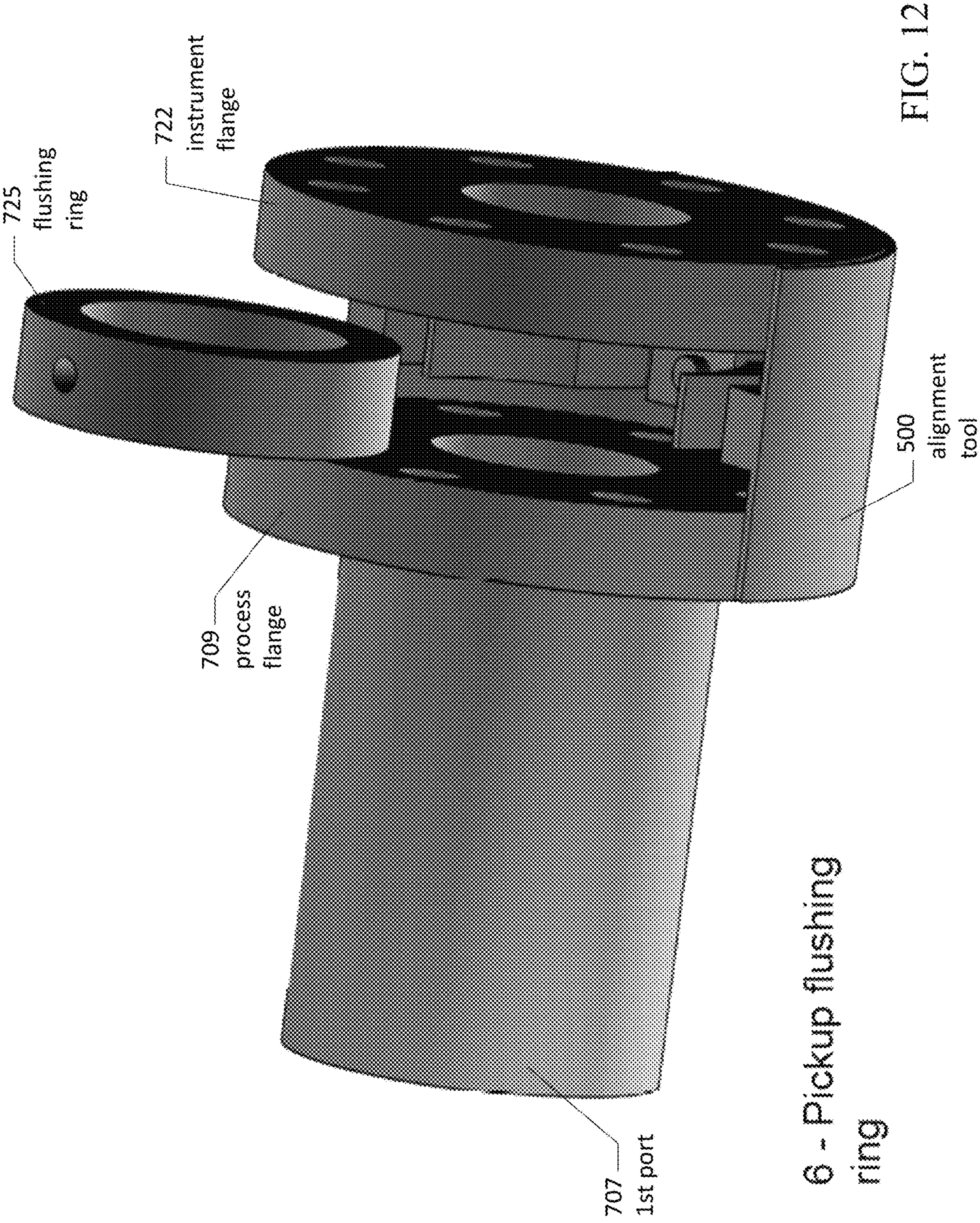
Figure 13:
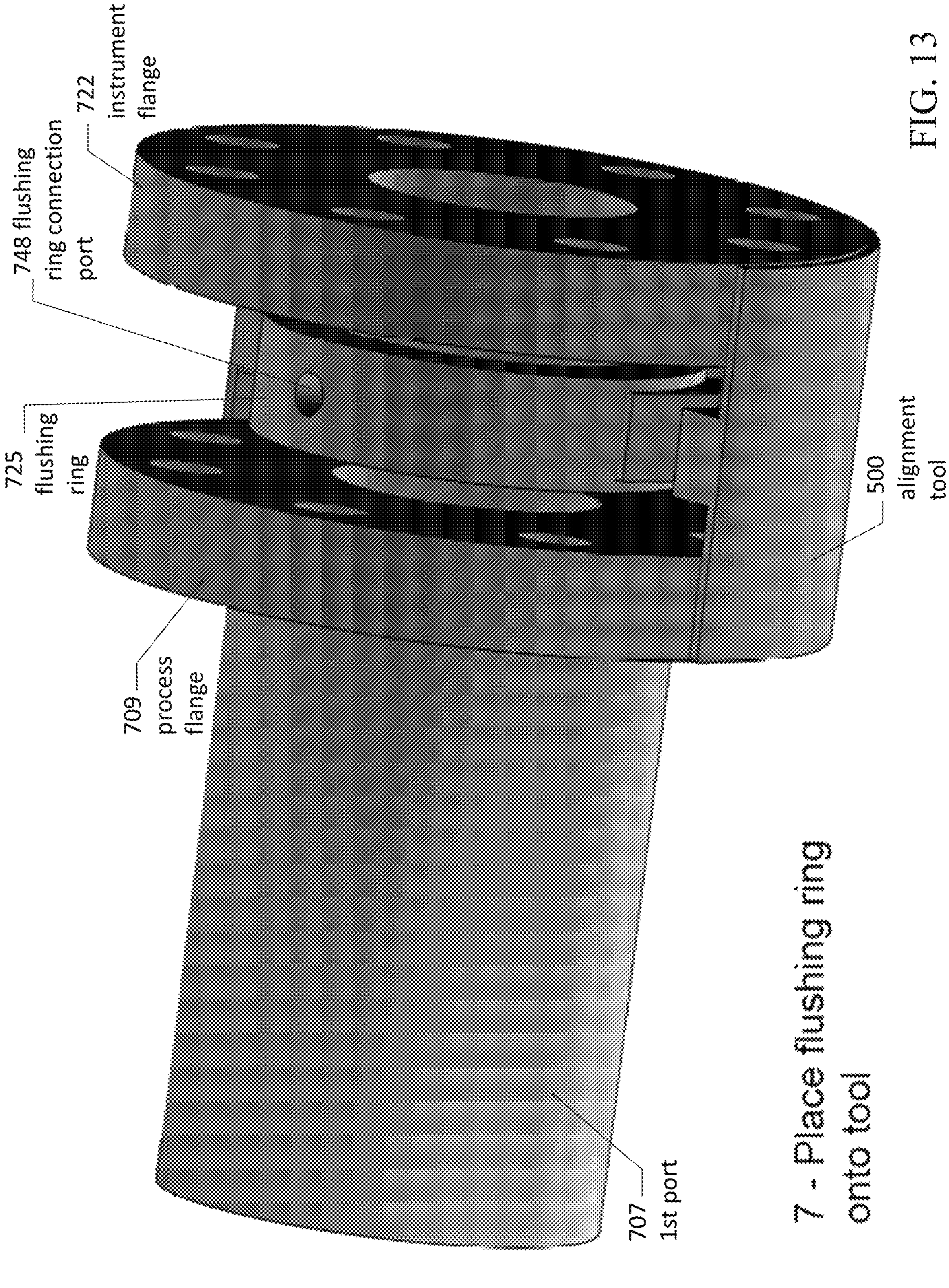

FIGS. 12 and 13 illustrate operations 6 and 7 in which the flushing ring 725 is placed between the process flange 709 and the instrument flange 722 and onto the alignment tool 500. The flushing ring rests on the bearing surfaces of the alignment tool 500. A flushing ring connection port 748 is visible along the outer circumference of the flushing ring. The flushing ring connection port can be attached to a line that conveys a cleaning fluid into the flushing ring. It should be understood that in alternate embodiments, operations 6 and 7 could be modified such that first the flushing ring is placed on the alignment tool with the instrument flange followed by the alignment tool with the instrument flange and flushing ring being brought into contact with the process flange.

Figure 14:
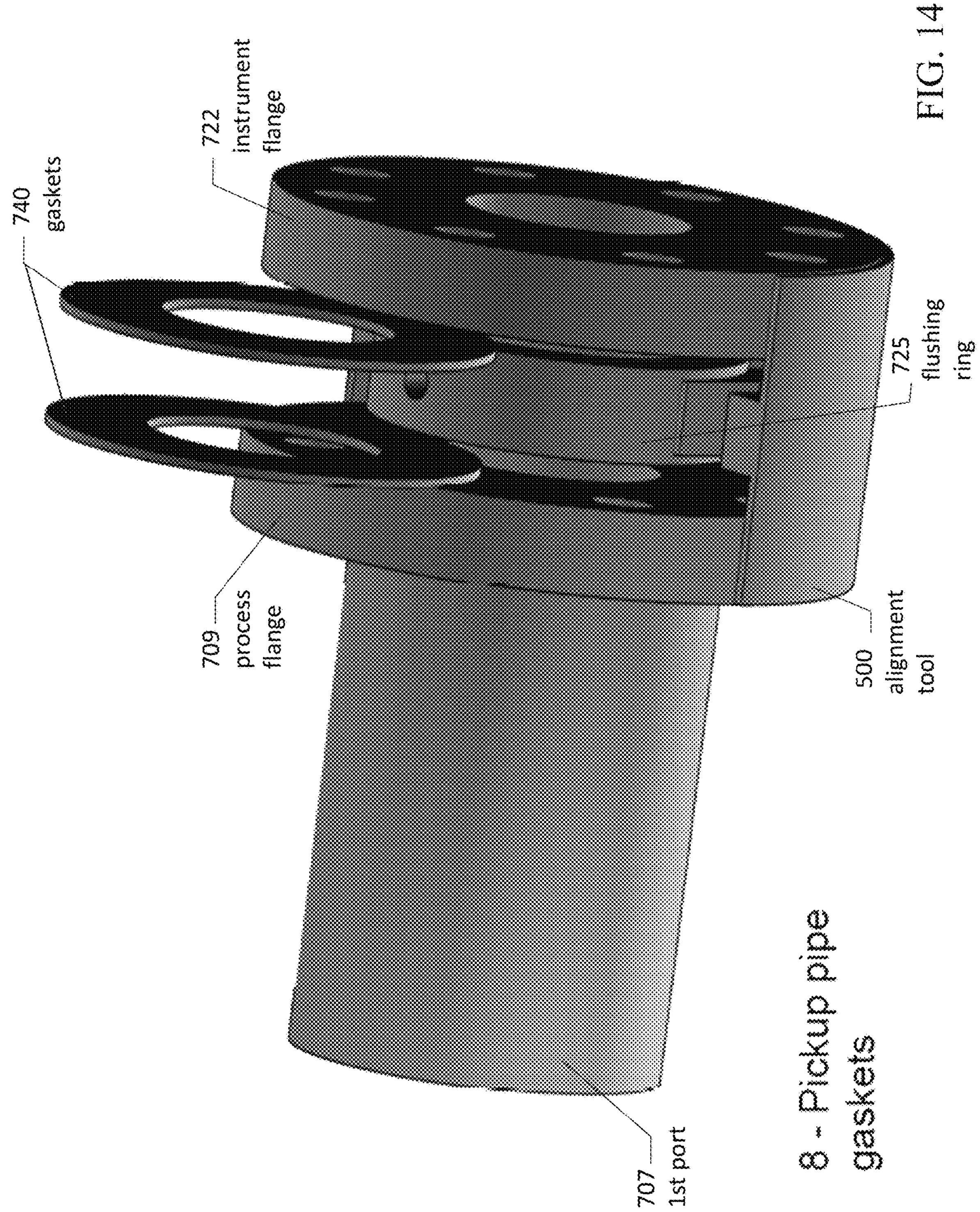
Figure 15:
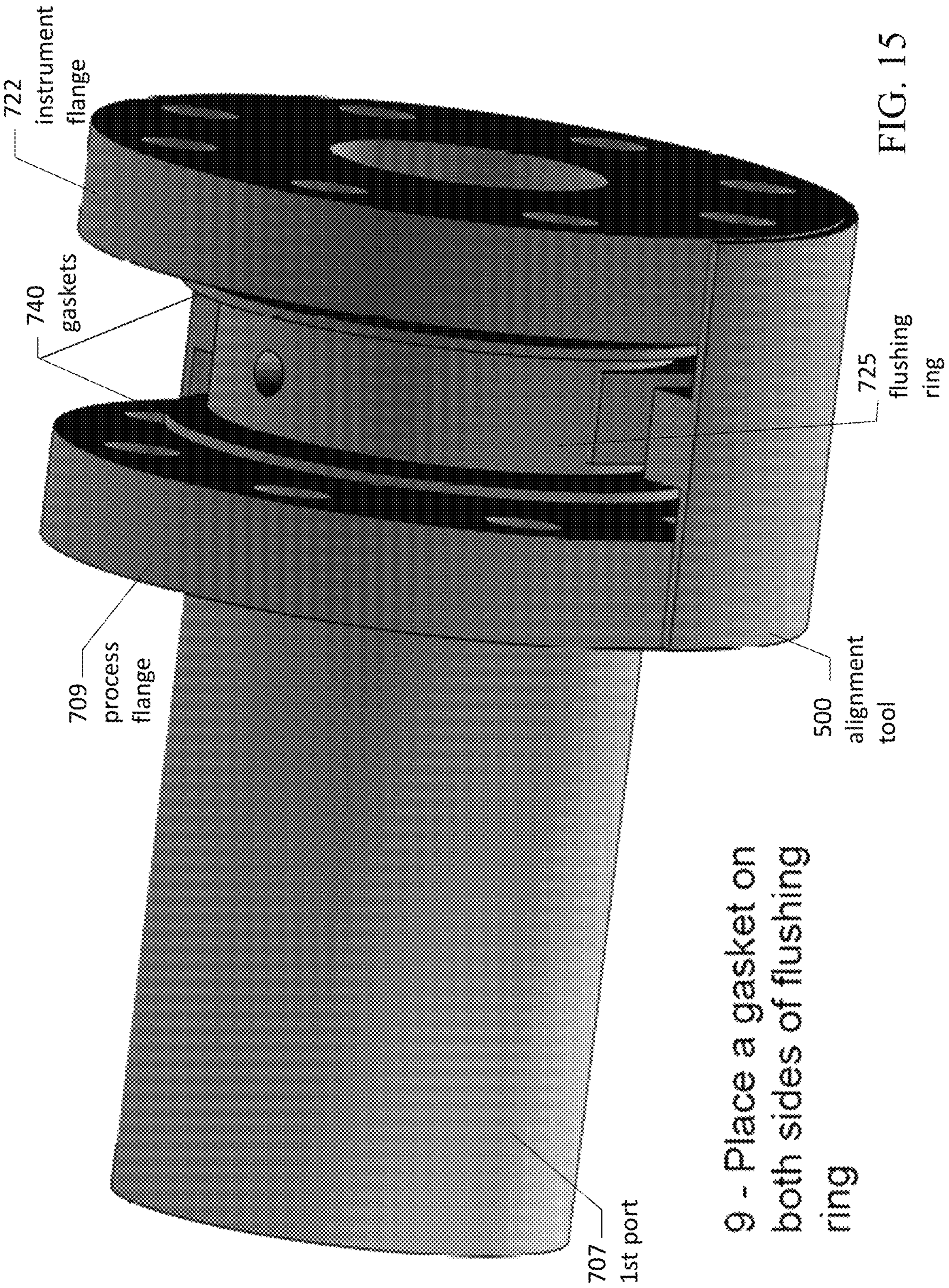
Figure 16:
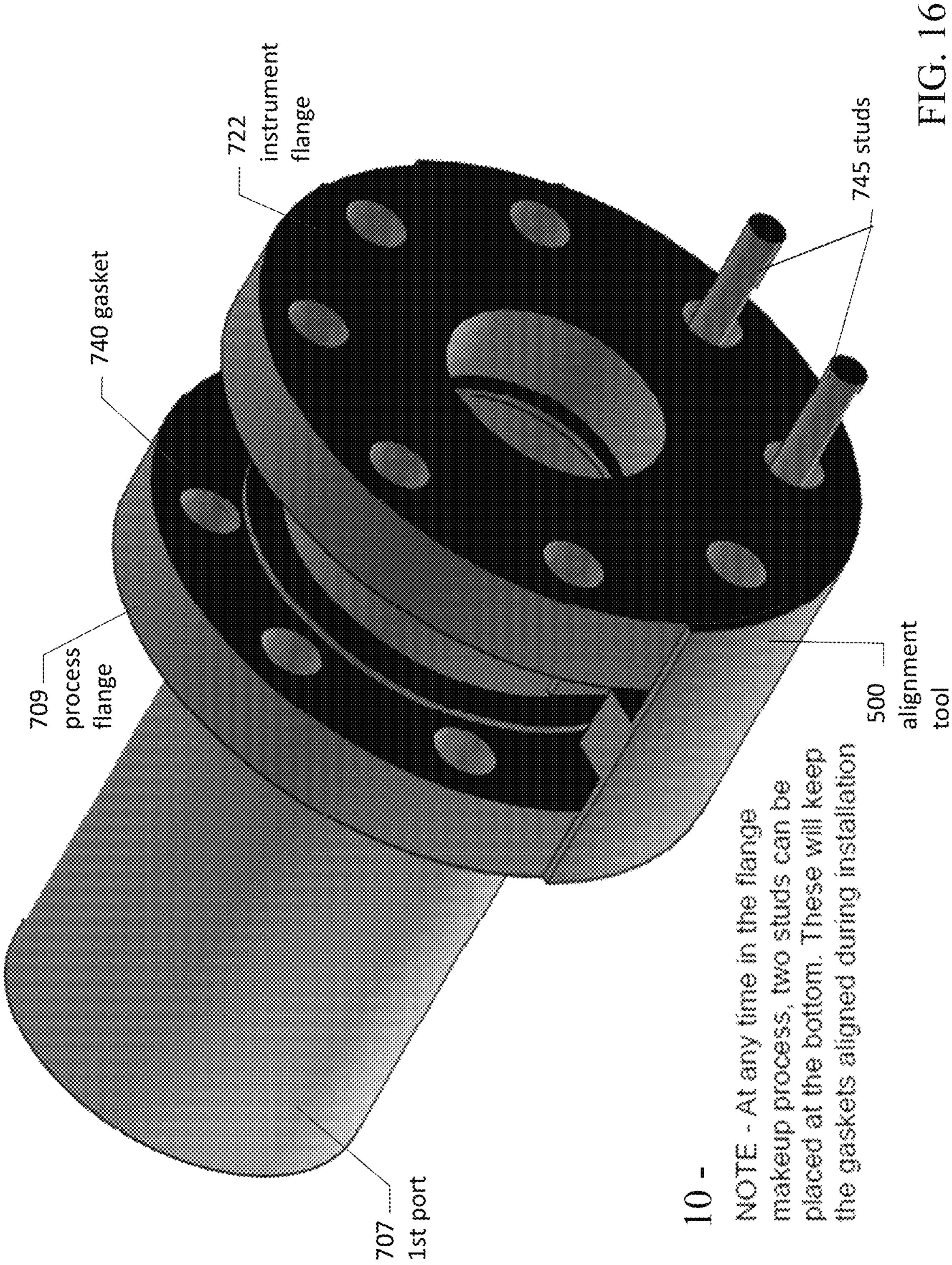

FIGS. 14 and 15 illustrate operations 8 and 9 in which gaskets 740 are placed on opposite sides of the flushing ring 725. The gasket adjacent the instrument flange can be referred to as the instrument gasket and the gasket adjacent the process flange can be referred to as the process gasket. The gaskets 740 assist in maintaining the seal between the process flange 709 and the instrument flange 722. Lastly, FIG. 16 illustrates operation 10 in which two studs 745 are placed through two of the fastener apertures of the instrument flange 722. The two studs 745 assist in keeping the gaskets 740 aligned. It should be understood that bolts or other fasteners can be used in place of the studs and that they can be inserted into the apertures before operations 8 and 9 in which the gaskets are placed into position. After operations 1-10 are completed, bolts or other fasteners are inserted into each of the fastener apertures of the instrument flange 722 and process flange 709 to secure the instrument flange 722 to the vessel. Once the instrument flange 722 is secured to the vessel, the alignment tool can be removed.

For any figure shown and described herein, one or more of the components may be omitted, added, repeated, and/or substituted. Additionally, it should be understood that in certain cases components of the example systems can be combined or can be separated into subcomponents. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

With respect to the example methods described herein, it should be understood that in alternate embodiments, certain steps of the methods may be performed in a different order, may be performed in parallel, or may be omitted. Moreover, in alternate embodiments additional steps may be added to the example methods described herein. Accordingly, the example methods provided herein should be viewed as illustrative and not limiting of the disclosure.

Terms such as “first”, “second”, “top”, “bottom”, “side”, “distal”, “proximal”, and “within” are used merely to distinguish one component (or part of a component or state of a component) from another. Such terms are not meant to denote a preference or a particular orientation, and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The terms “a,” “an,” and “the” are intended to include plural alternatives, e.g., at least one. The terms “including”, “with”, and “having”, as used herein, are defined as comprising (i.e., open language), unless specified otherwise.

When Applicant discloses or claims a range of any type, Applicant’s intent is to disclose or claim individually each possible number that such a range could reasonably encompass, including end points of the range as well as any sub-ranges and combinations of sub-ranges encompassed therein, unless otherwise specified. Numerical end points of ranges disclosed herein are approximate, unless excluded by proviso.

Values, ranges, or features may be expressed herein as “about”, from “about” one particular value, and/or to “about” another particular value. When such values, or ranges are expressed, other embodiments disclosed include the specific value recited, from the one particular value, and/or to the other particular value. Similarly, when values are expressed as approximations, by use of the antecedent “about,” it will be understood that the particular value forms another embodiment. It will be further understood that there are a number of values disclosed therein, and that each value is also herein disclosed as “about” that particular value in addition to the value itself. In another aspect, use of the term “about” means ±20% of the stated value, ±15% of the stated value, ±10% of the stated value, ±5% of the stated value, ±3% of the stated value, or ±1% of the stated value.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An alignment tool comprising:

a semicylindrical body having an inner surface, an outer surface, a process end surface, and an instrument end surface, wherein the inner surface comprises:
  - a process bearing surface, wherein the process bearing surface is configured to receive a process flange;
  - an instrument bearing surface, wherein the instrument bearing surface is configured to receive an instrument flange; and
  - a ring bearing disposed between the process bearing surface and the instrument bearing surface, wherein the ring bearing comprises:
    - a first fastener aperture;
    - a second fastener aperture; and
    - a ring bearing surface having an alignment feature, wherein the ring bearing surface is configured to receive a flushing ring, and wherein the alignment feature is configured to fit into a flushing ring connection port on the flushing ring.

2. The alignment tool of claim 1, wherein the first fastener aperture and the second fastener aperture pass through the ring bearing.

3. The alignment tool of claim 2, wherein the ring bearing surface is disposed between the first fastener aperture and the second fastener aperture.

4. The alignment tool of claim 3, wherein the first fastener aperture is disposed between the ring bearing surface and a first support wall and wherein the second fastener aperture is disposed between the ring bearing surface and a second support wall.

5. The alignment tool of claim 2, wherein first fastener aperture and the second fastener aperture are in the shape of a slot.

6. The alignment tool of claim 1, further comprising a first outer fastener aperture and a second outer fastener aperture.

7. The alignment tool of claim 6, wherein the ring bearing surface is disposed between the first fastener aperture and the second fastener aperture.

8. The alignment tool of claim 7, wherein the first fastener aperture is disposed between the ring bearing surface and a first support arm and wherein the second fastener aperture is disposed between the ring bearing surface and a second support arm.

9. The alignment tool of claim 8, wherein the first outer fastener aperture is disposed between the first support arm and a first support wall and wherein the second outer fastener aperture is disposed between the second support arm and the second support wall.

10. The alignment tool of claim 9, wherein the first fastener aperture, the first outer fastener aperture, the second fastener aperture, and the second outer fastener aperture are in the shape of a slot.

11. The alignment tool of claim 1, wherein the alignment tool is further configured to receive a first fastener in the first fastener aperture and a second fastener in the second fastener aperture.

12. The alignment tool of claim 11, wherein the alignment tool is further configured to receive:

an instrument gasket between the instrument flange and the flushing ring; and a process gasket between the process flange and the flushing ring.

13. The alignment tool of claim 1, wherein the alignment tool further comprises a first outer fastener aperture and a second outer fastener aperture; and wherein the alignment tool is further configured to receive a first fastener in the first fastener aperture, a first outer fastener in the first outer fastener aperture, a second fastener in the second fastener aperture, and a second outer fastener in the second outer fastener aperture.

14. A method for installing an instrument using an alignment tool, the method comprising:

placing a process bearing surface of the alignment tool against a process flange, the alignment tool comprising a semicylindrical body having an inner surface, an outer surface, a process end surface, and an instrument end surface, wherein the inner surface comprises:

the process bearing surface;

an instrument bearing surface; and a ring bearing disposed between the process bearing surface and the instrument bearing surface;

placing an instrument flange onto the instrument bearing surface of the alignment tool;

placing a flushing ring onto the ring bearing of the alignment tool such that an alignment feature of the ring bearing fits into a flushing ring connection port on the flushing ring;

inserting a first fastener through a first fastener aperture of the ring bearing;

inserting a second fastener through a second fastener aperture of the ring bearing;

placing an instrument gasket onto the alignment tool between the instrument flange and the flushing ring;

placing a process gasket onto the alignment tool between the process flange and the flushing ring;

tightening the first fastener and the second fastener thereby securing the instrument flange, the instrument gasket, the flushing ring, the process gasket, and the process flange together; and removing the alignment tool.

15. The method of claim 14, wherein the ring bearing comprises a ring bearing surface having an alignment feature and wherein the alignment feature aligns the flushing ring when the flushing ring is placed on the ring bearing surface.

16. The method of claim 15, wherein the ring bearing is disposed between the first fastener aperture and the second fastener aperture.

17. The method of claim 16, wherein the ring bearing further comprises a first outer fastener aperture and a second outer fastener aperture.

18. The method of claim 17, further comprising:

inserting a third fastener through the first outer fastener aperture of the ring bearing; and inserting a fourth fastener through the second outer fastener aperture of the ring bearing.

19. An alignment tool comprising:

a semicylindrical body having an inner surface facing radially inward toward a longitudinal axis of the semicylindrical body, an outer surface facing radially away from the longitudinal axis, a process end surface, and an instrument end surface, wherein the inner surface comprises:

a process bearing surface facing radially inward;

an instrument bearing surface facing radially inward; and a ring bearing extending in a radially inward direction and disposed longitudinally between the process bearing surface and the instrument bearing surface, wherein the ring bearing comprises:

a first fastener aperture;

a second fastener aperture; and a ring bearing surface having an alignment feature.

20. The alignment tool of claim 19, wherein the ring bearing surface is configured to receive a flushing ring, and wherein the alignment feature is configured to fit into a flushing ring connection port on the flushing ring.

* * * * *